United States Patent
Tsuchiya et al.

(10) Patent No.: US 6,459,549 B1
(45) Date of Patent: Oct. 1, 2002

(54) HARD DISK DRIVE WITH SLIDER SUPPORT STRUCTURE AND HEAD GIMBAL ASSEMBLY

(75) Inventors: Tatsumi Tsuchiya, Ayase; Tatsushi Yoshida, Chigasaki; Hiroyasu Tsuchida, Yokohama; Hiroo Inoue, Fujisawa, all of (JP); Surya Pattanaik, San Jose, CA (US); Hiromi Ishikawa, Fujisawa (JP); Masaaki Nanba, Yamato (JP)

(73) Assignee: International Business Machines Corporation, Armonk, NY (US)

(*) Notice: Subject to any disclaimer, the term of this patent is extended or adjusted under 35 U.S.C. 154(b) by 65 days.

(21) Appl. No.: 09/586,830

(22) Filed: Jun. 5, 2000

(30) Foreign Application Priority Data

Jul. 15, 1999 (JP) ............................................. 11-201630

(51) Int. Cl.⁷ ........................... G11B 21/16; G11B 5/48; G11B 21/08; G11B 5/55
(52) U.S. Cl. .................................. 360/245.9; 360/264.2
(58) Field of Search ........................ 360/245.4, 245.9, 360/245.8, 245.3, 244.1, 244, 240, 264.2, 266.3, 245.2

(56) References Cited

U.S. PATENT DOCUMENTS

| | | | | |
|---|---|---|---|---|
| 4,821,946 A | * | 4/1989 | Abe et al. ............... | 228/180.21 |
| 5,805,381 A | * | 9/1998 | Resh ....................... | 360/245.5 |
| 5,828,031 A | * | 10/1998 | Pattanaik ................ | 219/121.63 |
| 5,903,068 A | * | 5/1999 | Suzuki .................... | 29/594 |
| 5,949,618 A | * | 9/1999 | Arya et al. ............. | 219/121.64 |
| 6,336,581 B1 | * | 1/2002 | Tuchiya et al. ......... | 228/245 |

FOREIGN PATENT DOCUMENTS

| | | |
|---|---|---|
| EP | 10-2288618 A | 8/1998 |
| EP | 0 716 413 B1 | 5/1999 |
| JP | 09-282626 A | 10/1997 |

OTHER PUBLICATIONS

Suzuki et al, Aug, 23, 2001 US PAP 2001/0015891 A1.*

* cited by examiner

Primary Examiner—Robert S. Tupper
Assistant Examiner—Julie Anne Watko
(74) Attorney, Agent, or Firm—Robert B. Martin; Bracewell & Patterson, L.L.P.

(57) ABSTRACT

Apertures are formed in the portion of a flexure adjacent to the soldered portions between the bonding pads of the slider and the lead pads of lead end portions. With this, an adhesive agent for bonding the slider to a flexure tongue is moved downward from the apertures so there is no fear that the adhesive agent will contact the lead pads and the bonding pads. This design prevents the protrusion of an adhesive agent from short-circuiting the flexure, and absorbs a warp produced by shrinkage of a soldered portion by decreasing rigidity of the flexure. When both the bonding pad formed on the slider and the lead pad of a lead fixed to the platform of the flexure are disposed and soldered, the quality of the soldered portion is improved by locating the pads as close to each other as possible.

6 Claims, 11 Drawing Sheets

HARD DISK DRIVE WITH SLIDER SUPPORT STRUCTURE AND HEAD GIMBAL ASSEMBLY

BACKGROUND OF THE INVENTION

1. Technical Field

The present invention relates to a hard disk drive and a slider support structure having a head for moving the slider close to the disk recording surface of the hard disk drive, the construction of a head gimbal assembly, and a manufacturing method thereof. More particularly, the invention relates to the construction of a flexure for directly holding the slider, the construction of the pad of a point portion of a lead line, and a method of joining the slider pad and the lead pad.

2. Description of the Related Art

There are two prior art methods for joining a slider and a lead line: the bent lead method and the gold ball method. In the bent lead method of FIG. 11, the point portion of a lead 53 is pressed against a pad 63 formed on a slider 52 by the wedge 58 of a ultrasonic welder. Ultrasonic vibration is then applied to join these. elements. In the gold ball method of FIG. 12, the pad 63 of a slider 52 and the point portion of a lead 54 are orthogonally oriented relative to each other, and a metal line 56 supported by a damper 57 is moved near them through a capillary 55. The point portion of metal line 56 is melted into a spherical shape by heat means such as an electrode or the like, and pressed against the pad 63 of the slider 52 and the point portion of the lead 54 such that they are joined by thermal adhesion. In the gold ball method, the joined portion is reinforced with an ultrasonic weld.

In these two connection methods, the slider 52 must be fixed to an operating jig or the like in the ultrasonic joining process. For this reason, an aperture (indicated at reference numeral 59h in FIG. 12), through which a push member (not shown) acting on the slider 52 in the direction of arrow P in FIGS. 11 and 12 is passed, is provided in a load beam 59 to push the slider 52 against a fixed table (not shown).

Aperture 59h restricts the configuration of the point portion of the load beam 59 because it is formed in point portion, and makes a reduction in the weight of the load beam difficult. For this reason, an improved joining method which does not require an ultrasonic joining step is desirable.

In the background art, however, the construction of the head gimbal (HG) assembly adopted in the present invention involves the appropriation of the HG assembly adopted in the aforementioned gold ball method. A top view of the construction is shown in FIG. 13 and a sectional view, taken along index line 105—105 of FIG. 13, is shown in FIG. 14.

The slider 52 in the figures is fixed to a flexure tongue 59a, formed by a pair of slits 61a and 61b of a flexure 59 and an aperture 61c connected to them, through an insulating sheet 60b, and four leads 54 are also fixed to the flexure 59 through an insulating sheet 60a. The lead pad 54, which is one end portion of the lead 54, is formed to have a large area and is disposed at a position adjacent to a bonding pad 63 provided on the slider 52, while the other end portion of the lead 54 is connected to a multi-connector (not shown) to be connected to an external unit. And the lead pad 54a and the bonding pad 63 are joined by a solder ball joining method to be described infra, whereby a soldered portion 64 is formed therebetween.

On the other hand, the point portion 52a of the slider 52 is mounted on the insulating sheet 60a laid under the lead pad 54a, as shown in FIG. 14. This is due to the following reasons. The rear end (left end in FIG. 14) of the insulating sheet 60a may originally be formed (at a position indicated by a broken line in FIG. 14) so that it is aligned with the rear end (left end in FIG. 14) of the lead pad 54a; however, in this case, the rear end will protrude in the direction of arrow S because of an error during manufacturing. The spacing between the rear end of this lead pad 54a and the point portion 52a of the slider 52 is set to tens of μm, so that the fluctuation that the point portion 52a is now mounted on the insulating sheet 60a and then is not mounted will occur in fixing the slider 52 to the flexure tongue 59a and will cause incommodity to occur.

To avoid this incommodity, the rear end of the insulating sheet 60a is previously extended in the direction of arrow S so that the point portion 52a of the slider is mounted on the insulating sheet 60a with reliability. And by interposing the insulating sheet 60b with the same thickness as the insulating sheet 60a between the flexure tongue 59a and the slider 52, the slider 52 is prevented from inclining.

Problems to be Solved by the Invention

Although the point portion 52a (FIG. 14) of the slider 52 is mounted on the insulating sheet 60a, as described supra and is fixed with a conductive adhesive agent 65 in the same way as the other places, there is a possibility that this adhesive agent 65 will protrude from the joined portion and contact the lead pad 54a, the bonding pad 63, and the soldered portion 64. Also, if the lead pad 54a is sufficiently spaced from the boding pad 63 in order to prevent the adhesive agent 65 from contacting the lead pad 54a, there is a problem that soldering conditions will go bad.

In addition, since the slider 52 is fixed to the flexure tongue 59a through the insulating sheet 60b with the same thickness as the insulating sheet 60a, the position of the bonding pad 63 provided on the slider 52 becomes higher than the lead pad 54a, so that it becomes difficult to move both close together.

Moreover, the bonding pad 63 formed on the slider 52 is spatially restricted and only a limited area can be ensured for each pad. On the other hand, the lead pad 54a has enough space and a wide area is ensured. For this reason, the heat capacity of the lead pad 54a becomes greater compared with the boding pad 63, so there is a fear that the difference between a rise in temperature and a drop in temperature will occur when solder reflows and will incur defective soldering.

Furthermore, the soldered portion 64 shrinks with a reduction in temperature after join, so there is a problem that a warp will be produced due to this shrinkage and the rigidity of the flexure 59 and the HG assembly cannot be supported at a predetermined posture.

An object of the present invention is to provide the construction and the manufacturing method of the HG assembly suitable for the solder ball joining method, while overcoming these various problems.

SUMMARY OF THE INVENTION

An elastic flexure has a flexure tongue, an aperture, and a slider attached to the flexure tongue in a predetermined direction. The flexure functions as a suspension having an array of leads supported by the flexure so that one end portion of each lead has a pad facing substantially perpendicular to a pad-joint surface. The pad-joint surface is formed on the slider and the aperture is formed so that at least a tip of the pad is included in the area of the aperture.

In accordance with one aspect of the present invention, the pad formed on the lead has nearly the same heat capacity as that of the pad formed on the slider.

In accordance with another aspect of the present invention, there is provided a flexure having an aperture, the flexure having elasticity and functioning as a suspension; a slider supported on the flexure and formed with a plurality of first pads; and a plurality of leads supported by the flexure so that one end portion of each lead having a second pad faces substantially perpendicular to a pad-joint surface of the first pad and so that the second pads are located in proximity to the plurality of first pads, respectively; in which the aperture is formed so that positions that the first and second pads are adjacent to are included in the area of the aperture.

In accordance with a further aspect of the present invention, there is provided a head gimbal assembly comprising a flexure having an aperture, the flexure having elasticity and functioning as a suspension; a slider supported on the flexure and formed with a plurality of first pads; and a plurality of leads supported by the flexure so that one end portion of each lead having a second pad faces substantially perpendicularly to a pad-joint surface of the first pad and so that the second pads are located in proximity to the plurality of first pads, respectively; wherein a heat capacity of said first pad and a heat capacity of said second pad are nearly the same.

In accordance with a further aspect of the present invention, there is provided a method of fabricating a head gimbal assembly comprising (1) a flexure with an aperture; (2) a slider supported on said flexure and formed with a plurality of first pads; and (3) a plurality of leads supported on the flexure so that one end portion of each lead having a second pad faces substantially perpendicularly to a pad-joint surface of the first pad and such that the second pads are disposed in proximity to the plurality of first pads, respectively; the aperture being formed so that positions that the first and second pads are adjacent to are included, in the area of the aperture; the method characterized by comprising the steps of: abutting a solder ball with the first and second pads; emitting laser light to the solder ball to cause the solder ball to reflow; and electrically connecting the first and second pads.

DETAILED DESCRIPTION OF ILLUSTRATIVE EMBODIMENT

Figure 1:
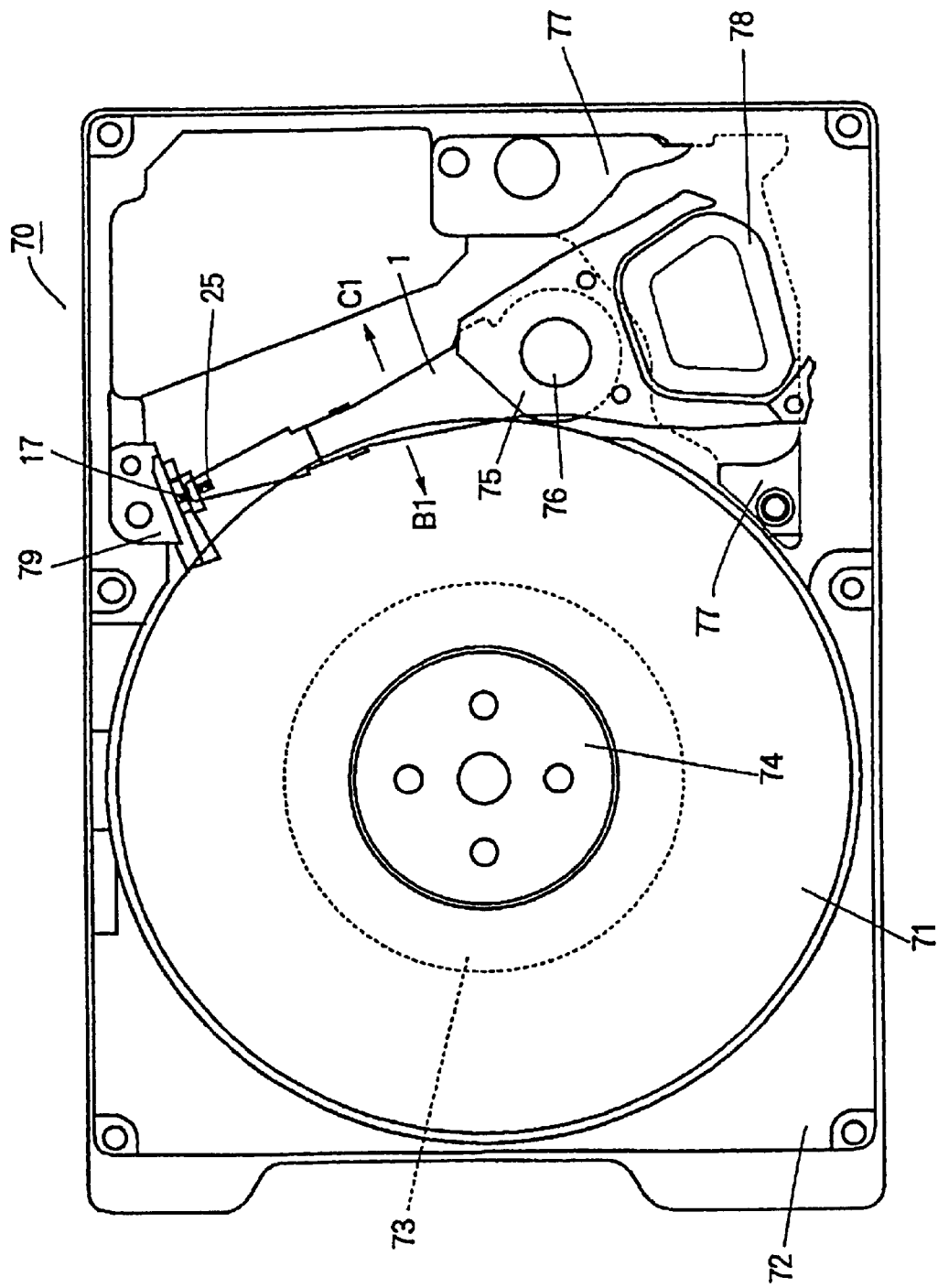
FIG. 1 is a top view of a hard disk drive 70 showing an embodiment of the present invention.

FIG. 1 is a top view of a hard disk drive 70 showing an embodiment of the present invention. In the figure, a disk 71 is supported integrally on the hub 74 of a spindle motor 73 mounted on a base 72 and is driven to rotate by the spindle motor 73. A HG assembly 1 to be described infra is formed integrally with a coil support portion 75 and freely rotatably supported by a rotating shaft 76 stood up in the base 72.

This coil support 75 holds a coil 78 at the opposite side from the HG assembly 1 with respect to the rotating shaft 76. This coil 78 constitutes a voice coil motor (hereinafter referred to as a VCM) along with a magnet (not shown) fixed above the coil 78 to an upper magnet holding plate 77 fixed to the base 72 and rotates the HG assembly 1 in the direction of arrow B1 or C1.

Note that in FIG. 1, the upper essential portion of the upper magnet holding plate 77 is cut out and shown for convenience, the external form being shown by a broken line. Also, a lower magnet holding plate (not shown) for holding a magnet constituting the VCM at the position opposed to the coil 78 is provided under the coil 78.

The point portion of the HG assembly 1 holds a slider 25, and at predetermined positions on the slider, heads for reading out and writing a signal, described infra, are provided. When the HG assembly 1 rotates in the direction arrow B1 and moves over the recording surface on the hard disk 71, the slider 25 flies over the recording surface of the disk 71 such that the head is opposed with a predetermined space to the recording surface.

A ramp 79 disposed on the base 72 places the tab 17 of the point portion of the HG assembly 1 thereon, when the HG assembly 1 is unloaded and is at its home position. The aforementioned description has been made on the assumption that the hard-disk 71 is a single one-sided disk. However, when data is recorded on both sides of a hard disk, another HG assembly for holding a head that scans each recording surface is prepared. The other HG assembly is fixed to the coil support 75 at an overlapping position spaced a predetermined distance from the HG assembly 1 of FIG. 1.

Furthermore, when data is recorded on a plurality of double-sided hard disks, they are integrally supported with predetermined spaces in the direction of the rotational axis of the spindle motor 73 by the hub 74. And HG assemblies for holding a head that scans each recording surface are prepared by the number of recording surfaces and are fixed to the coil support portion 75 at overlapping positions spaced predetermined distances from the HG assembly 1 of FIG. 1. Since this structure itself is well known in the background art, a detailed description thereof is omitted.

Figure 2:
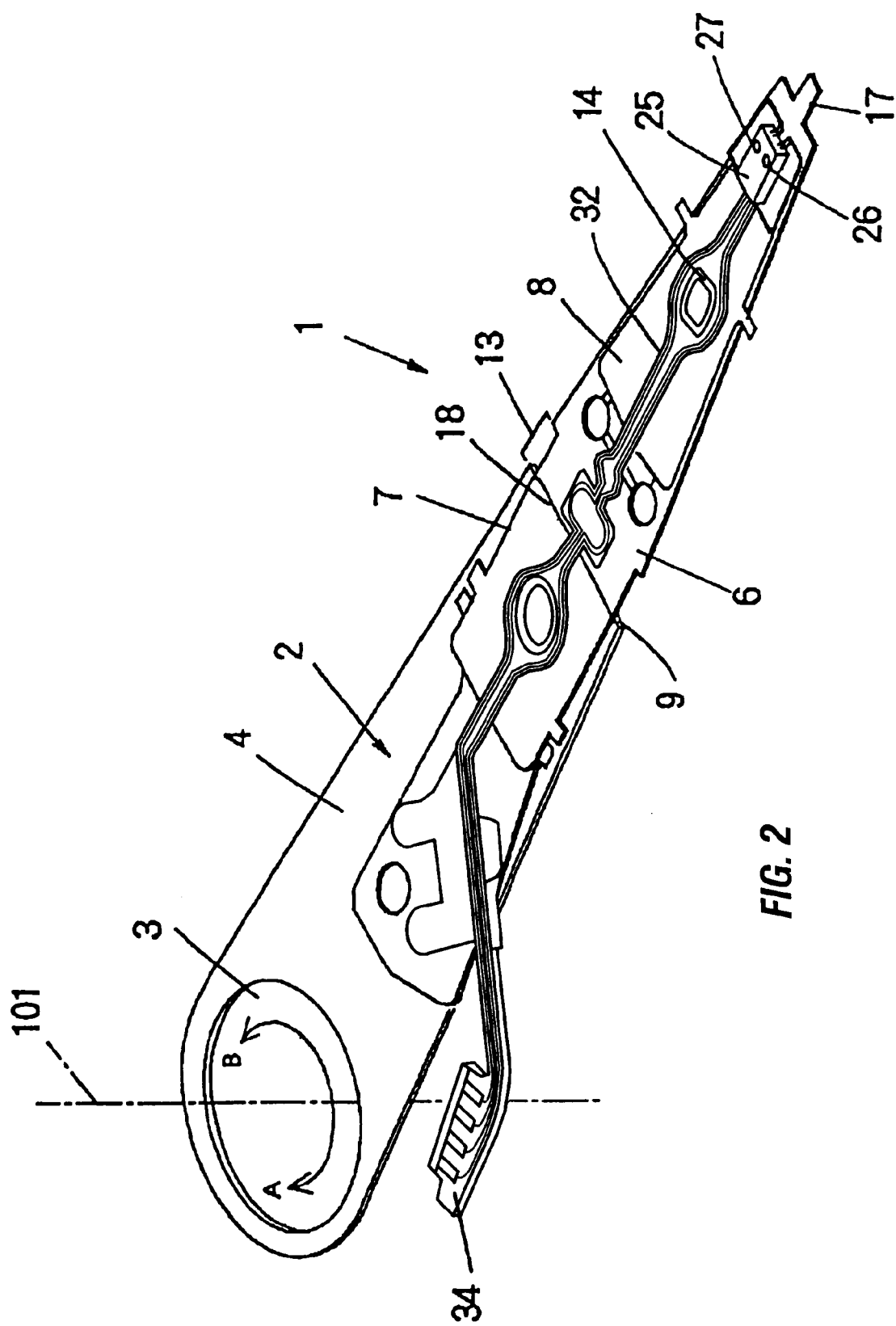
FIG. 2 is a perspective view of a head gimbal (HG) assembly 1 showing the embodiment of the present invention.
Figure 3:
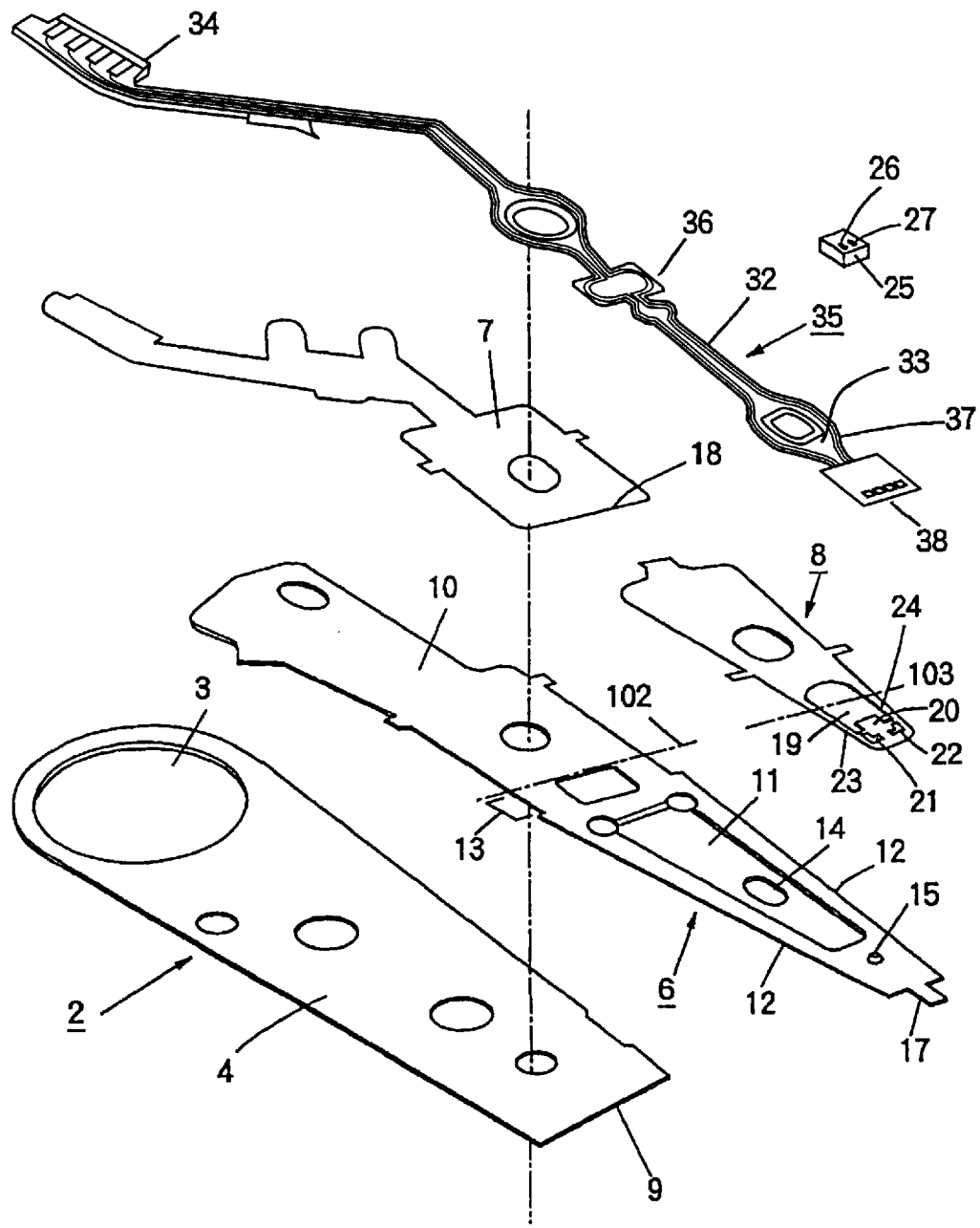
FIG. 3 is an exploded perspective view showing the stacked components of this HG assembly 1, the components being disassembled in sequence.

FIG. 2 is a perspective view of the HG assembly 1 showing the embodiment of the present invention, while FIG. 3 is an exploded perspective view showing the stacked components of this HG assembly 1, the components being disassembled in sequence.

In the figures, an actuator arm 2 is formed integrally with the aforementioned coil support portion 75 (FIG. 1); is freely rotatably supported by the rotating shaft 76 (FIG. 1); and is driven by the VCM. On the other hand, a load beam 6, a mounting plate 7, and a flexure 8 are bonded in a predetermined relationship described infra, particularly the load beam 6 and the flexure 8 constituting an integral type suspension.

The plane portion 10 of the load beam 6 is fixedly joined to the plane portion 4 of the actuator arm 2 such that the edge 9 of the actuator arm 2 is aligned with the index line 102 (FIG. 3) of the load beam 6. This load beam 6 is made, for example, of elastic stainless steel with a thickness of 0.038 to 0.05 mm such that it is thin and light in weight and holds necessary rigidity.

A predetermined portion of the load beam 6, which is not bonded to the actuator arm 2, is formed with a generally trapezoidal portion 11 depressed in the up-and-down direction of FIG. 3 by a pressing process, and furthermore, both edges along the longitudinal direction are bent, excluding a portion 13 adjacent to the edge 9 and is formed with a flange 12 (FIG. 4), thereby enhancing rigidity. The portion 13 not formed with the flange 12 has elasticity and constitutes a hinge portion.

In addition, within the depressed portion 11 of the load beam 6, an elongated elliptic regulation hole 14 is formed. The plane portion of the load beam 6 closer to the point portion than the depressed portion 11 is formed with a gimbal pivot 15 projecting in the upward direction of FIG. 3, described infra. Furthermore, the point portion of the load beam 6 is formed with a tab 17.

The mounting plate 7 and the flexure 8 are both joined to the load beam 6. At this time, the mounting plate 7 is disposed such that its edge 18 is aligned with the index line 102 (FIG. 3) of the load beam 6. And the flexure 8, excluding a portion from the index lint 103 (FIG. 3) to the point portion, is joined to the load beam 6 so as to cover the trapezoidal depressed portion 11.

The flexure 8 is made, for example, of stainless steel with a thickness of about 20 μm and has a desired elasticity. And an arch-shaped aperture 19 is formed from the joined portion toward the non-joined portion, the central portion of the bottom of this aperture 19 near the point of the flexure 8 being formed with a flexure tongue 20 protruding toward the center. The mounting plate 7 may also be made of stainless steel of the same material as the flexure 8.

An integral type conductive lead 35 is formed by integrally bonding 4 leads 32 to an extremely thin, insulating sheet 33 so that they do not contact one another. One end of each lead is arranged in a row in order to constitute a multi-connector portion 34, while the other end of each lead is set so that the individual lead ends can be connected to the pad-joint surfaces of 4 bonding pads 28, 29, 30, 31 (FIG. 6) formed on the slider by a joining method described infra.

And the portion of the integral-type conductive lead 35 leading from the multi-connector portion 34 to a curved portion 36 (excluding the curved portion 36) is bonded on the mounting plate 7, as shown in FIG. 2. And the portion, leading from the curved portion 36 to the terminal portion 37 of the insulating sheet 33 (excluding the curved portion 36), and the other end of the lead 32 are bonded to the flexure 8. Note that the other end of the lead 32 is bonded on the flexure 8 through an insulating sheet 38.

In the slider 25, a magneto resistive head (hereinafter referred to as an MR head) 26 for reading out data and an electromagnetic induction write head 27 are provided at predetermined positions, respectively (the heads in the figure are shown for convenience and therefore their positions are not correct ones). Each head has 2 leader lines (not shown), the individual leader lines being connected to 4 bonding pads 28, 29, 30, 31 (FIG. 6), respectively. And this slider 25 is fixed and attached to the flexure tongue 20 with an adhesive agent.

Next, a description will be made of the mutual disposition of a pair flexure arms 23, 24 constituted with both side portions of the aperture 19 of the flexure 8, a pair of L-shaped apertures 21, 22 formed near the point portion of the flexure 8, the gimbal pivot 15 formed on the load beam 6, the slider 25 bonded to the flexure tongue 20, and so on.

Figure 4:
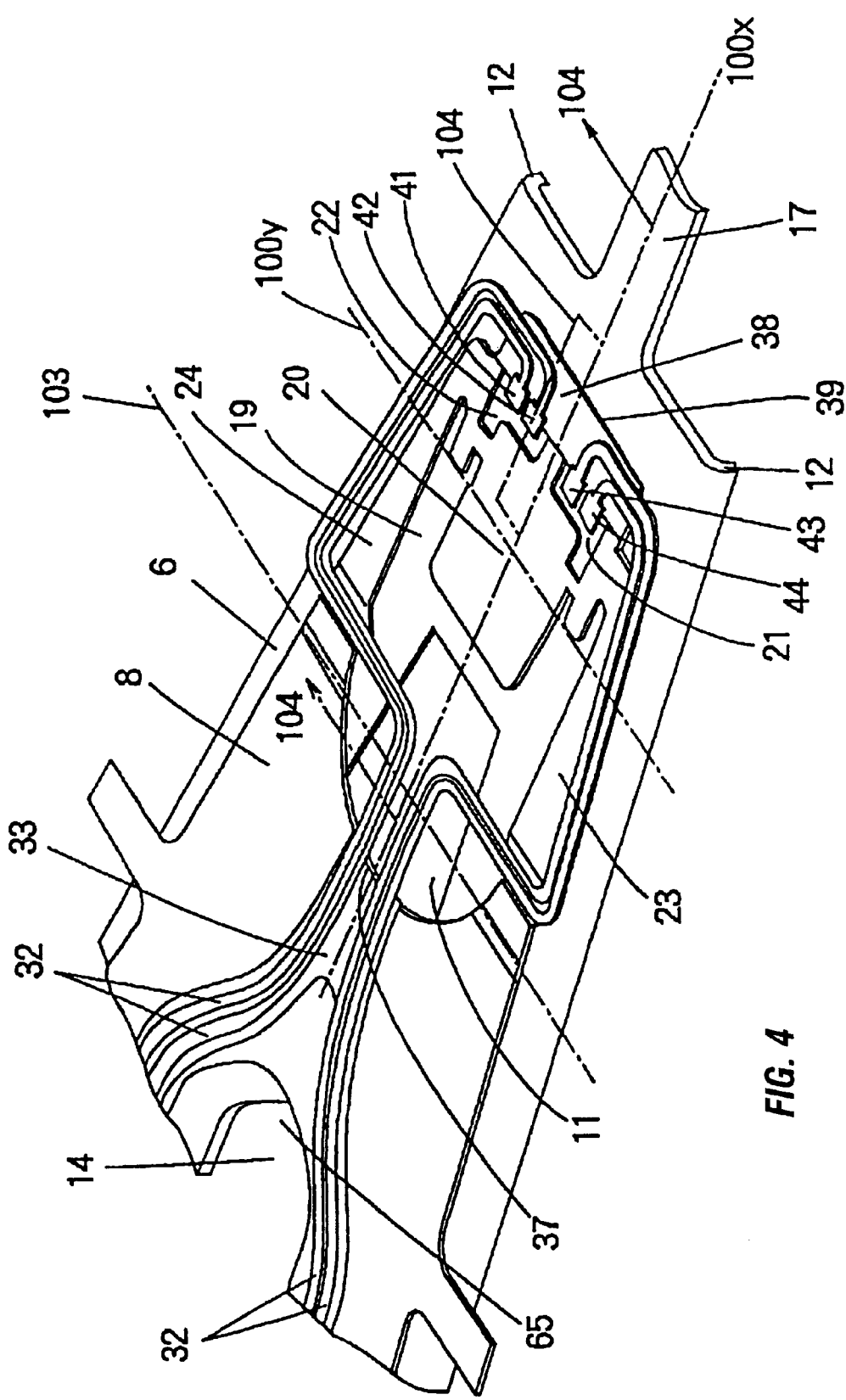
FIG. 4 is a part-enlarged view of the point portion of the HG assembly 1 before the slider 25 is attached.
Figure 5:
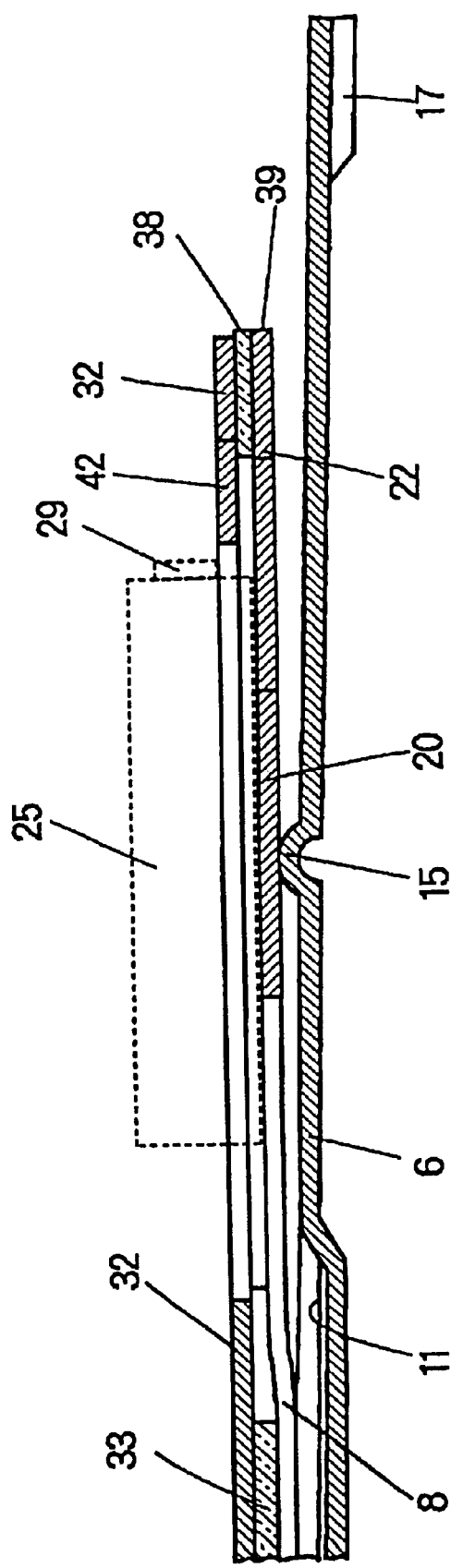
FIG. 5 is a sectional view taken along index line 104 in FIG. 4.
Figure 6:
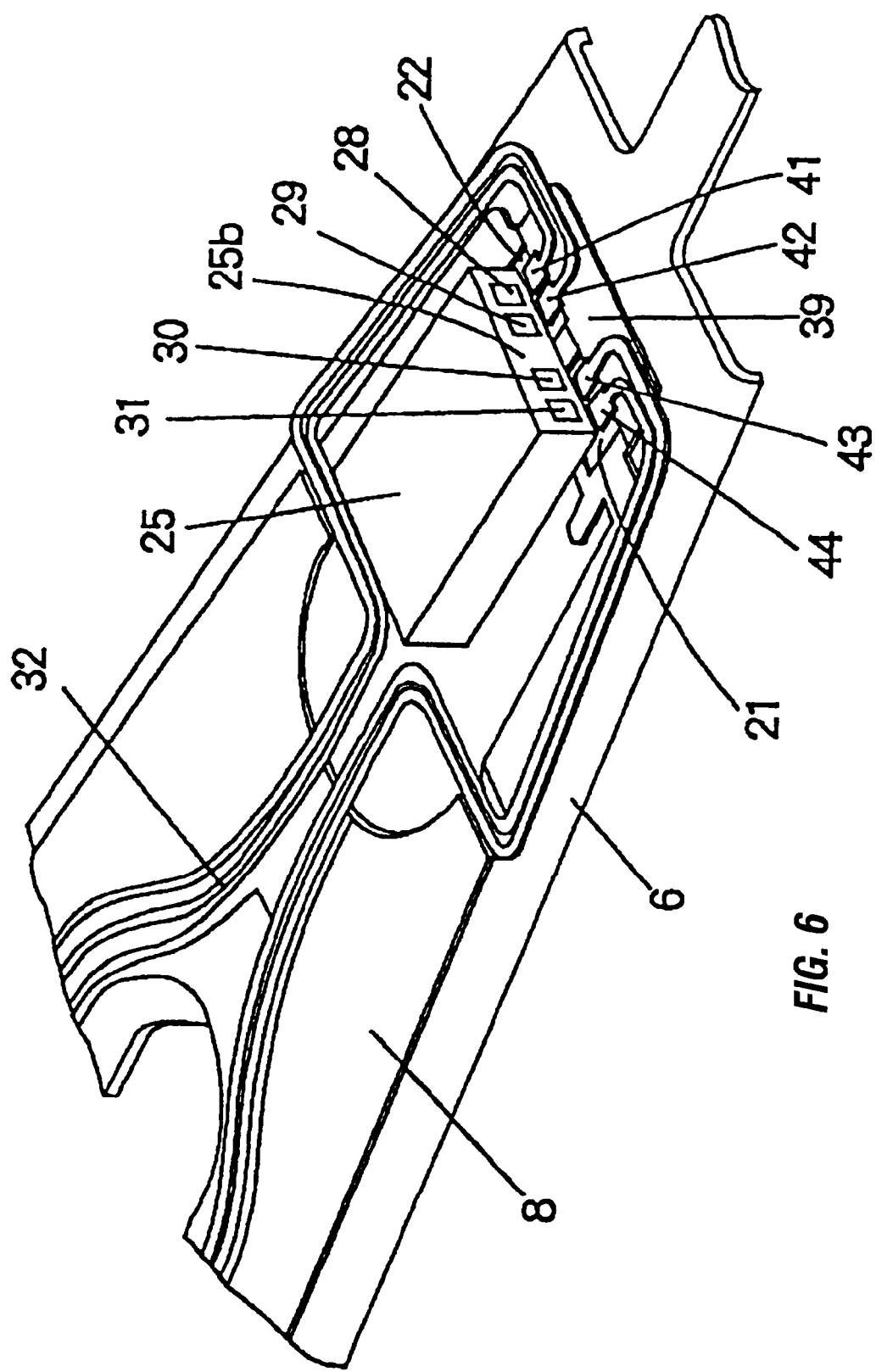
FIG. 6 is a perspective view of the point portion of the HG assembly 1, the slider 25 being attached to the flexure tongue 20.

FIG. 4 is a part-enlarged view of the point portion of the HG assembly 1 before the slider 25 is attached. FIG. 5 is a sectional view taken along index line 104. FIG. 6 is a perspective view of the point portion of the HG assembly 1, the slider 25 being attached to the flexure tongue 20.

In the load beam 6, the gimbal pivot 15 (FIG. 5) is formed as described supra. On the other hand, the flexure 8 is bonded to the load beam 6 until the index line 103, and the flexure arms 23, 24, not bonded, elastically support the flexure tongue 20 continuous thereto.

With the joint between the load beam 6 and the flexure 8, the flexure tongue 20 is supported at one point by the gimbal pivot 15. This abutted portion is on a 100x axis (FIG. 4) equivalent to the longitudinal center line of the flexure 8, and a 100y axis passing through the abutted portion and crossing the 100x axis perpenicularly is shown in the same figure. At this time, the flexure arms 23, 24 are slightly warped, whereby the flexure tongue 20 is pressed against the gimbal pivot 15.

The slider 25 is disposed on the flexure tongue 20 such that the central portion of the slider 25 is substantially overlaid on the portion abutted by the gimbal pivot 15, as shown by a broken line in FIG. 5. With this, the slider 25 becomes rotatable slightly with the 100x and 100y axes as center, and a predetermined tilt in all directions becomes possible.

The four leads 32 are fixed to the flexure 8 until the front end portion 37 of an insulating sheet 33 and are also fixed to the flexure 8 through an insulating sheet 38 at the portion of the platform 39 of the foremost portion of the flexure 8 located on the opposite side of the flexure tongue 20 across two apertures 21, 22. Between them, the four leads 32 are bent two by two in pairs in crank form along the flexure arms 23, 24 and float in the air so as not to contact one another.

The individual other end portions of the leads 32, paired two by two, are curved from the platform 39, through two apertures 21, 22, and toward the flexure tongue 20, respectively. Furthermore, the end portions form lead pads 41, 42, 43, 44 in accordance with the pad-joint surfaces of the bonding pads 28, 29, 30, 31 (FIG. 6) formed on the slider 25 that is attached to the flexure tongue 20.

The lead pad 42, as shown in FIG. 5, is in part supported on the platform 39 in consideration of strength, but the most part floats. It is also preferable that the heat capacity be nearly the same as the bonding pad 29. The other lead pads are also constructed the same. Now, a description will be made of a method of electrically joining the bonding pads 28, 29, 30, 31 (FIG. 6), formed on the slider 25, and the lead pads 41, 42, 43, 44 (FIG. 6) of leads 32, respectively.

Figure 7:
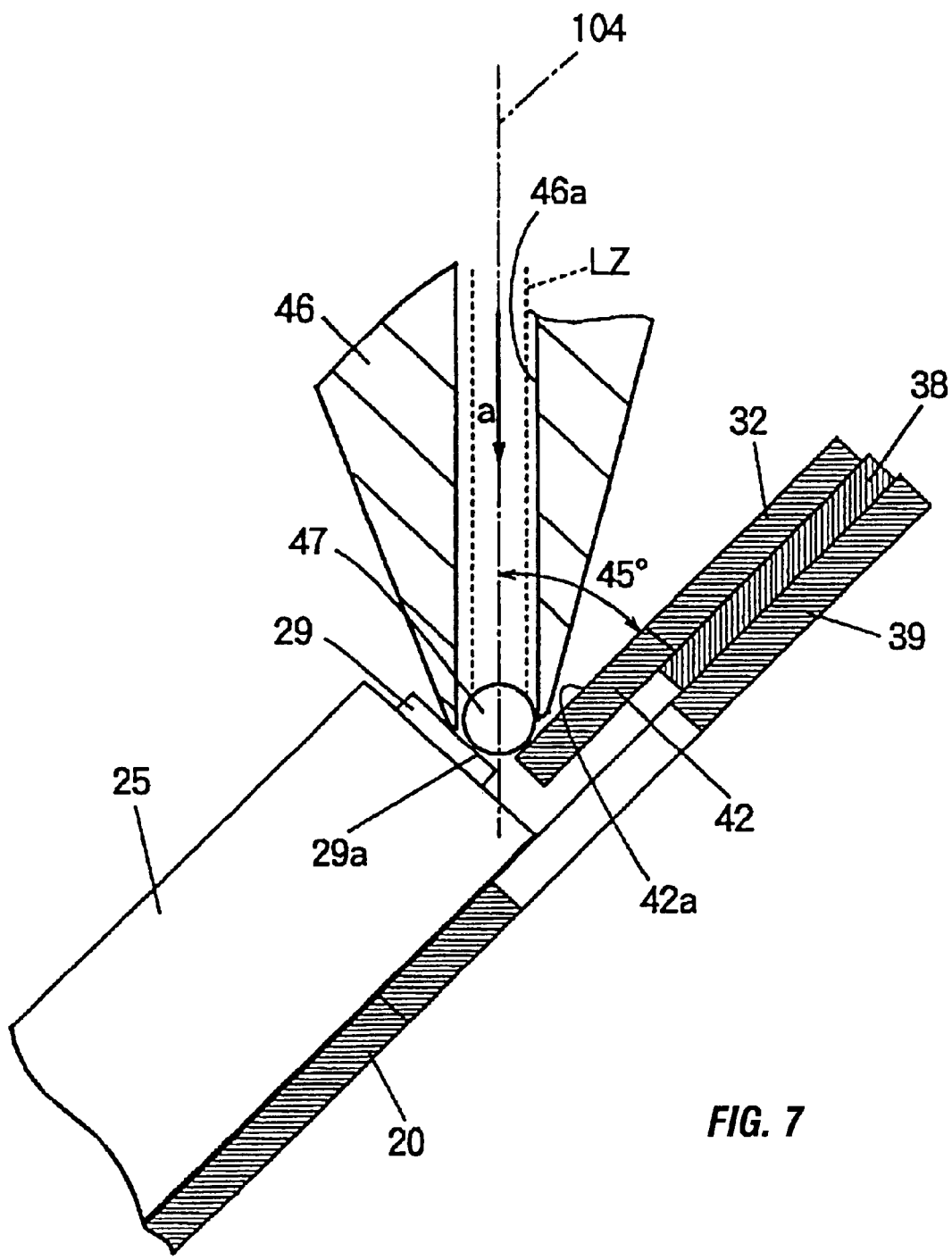
FIG. 7 is a part-enlarged view showing the neighborhood of the bonding pad 29 of the slider 25 and the lead pad 42 of the lead 32 that are joined by a solder ball joining method.

FIG. 7 is a part-enlarged view showing how the bonding pad 29 of the slider 25 and the lead pad 42 of the lead 32 are joined by the solder ball joining method, the section of the HG assembly 1 being shown at the same position as FIG. 5.

In performing solder-ball joining, the pad-joint surface 29a of the bonding pad 29 and the joining surface 42a of the lead pad 42 are supported with the HG assembly 1 (FIG. 2) inclined such that the surfaces 29a, 42a are at about 45 degrees relative to the direction that can take advantage of gravity so that the surfaces 29a, 42a are substantially perpendicular to each other.

On the other hand, a capillary 46 forms part of a solder ball joining apparatus (not shown), and its point portion is disposed at a position adjacent to the bonding pad 29 and the lead pad 42, with the center axis 104 of the inner cylindrical hollow portion 46a supported in the direction of utilizing gravity, i.e., at an angle of about 45 degrees with the joining surface 42a of the lead pad 42.

The solder ball joining apparatus stores a plurality of spherical solder balls 47 and sends out a single solder ball 47 to the point end through the hollow portion 46a after the capillary 46 has been located at the aforementioned desired position. At this time, nitrogen gas $N_2$ is caused to flow in the direction of arrow a, thereby urging the solder ball 47 to move in cooperation with gravity and also reaches the point portion of the capillary 46 and then slightly presses the solder ball 47 abutting both the pad-joint surface 29a of the bonding pad 29 and the joining surface 42a of the lead pad 42.

Figure 8:
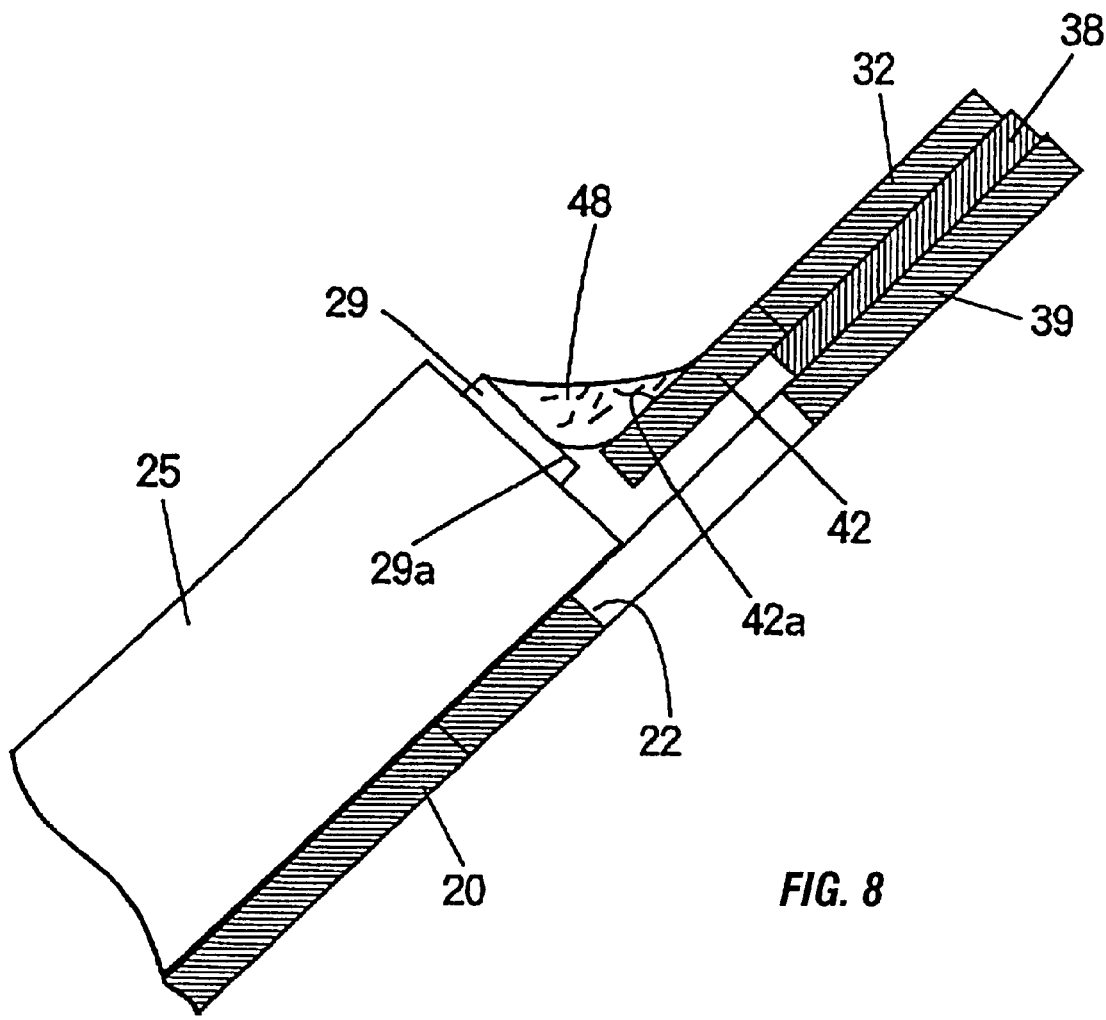
FIG. 8 is a diagram showing a solder portion joined by the solder ball joining method.

In this condition, the solder ball joining apparatus emits laser light (indicated by broken line LZ in FIG. 7) to the solder ball 47 through the hollow portion 46a of the capillary 46, thereby causing the ball to reflow. With this reflow, the solder ball 47 melts and wets the pad-joint surface 29a of the bonding pad 29 and the joining surface 42a of the lead pad 42, thereby forming a soldered portion 48 shown in FIG. 8. Note that the nitrogen gas $N_2$, flowing at this time, pushes the melted solder against each joining surface and also covers the solder and prevents oxidation thereof.

While the aforementioned has been described with relation to the case of joining the bonding pad 29 of the slider 25 and the lead pad 42 of the lead 32 with a solder ball, the join between pads at each of the 3 other places is also executed the same by changing the position of placing the capillary 46.

Figure 9:
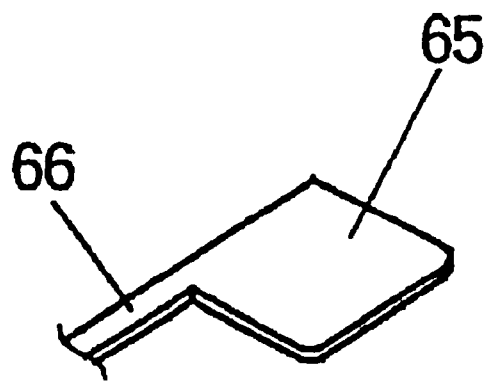
FIG. 9 is a construction diagram showing another embodiment of the configuration of the lead pad.
Figure 10:
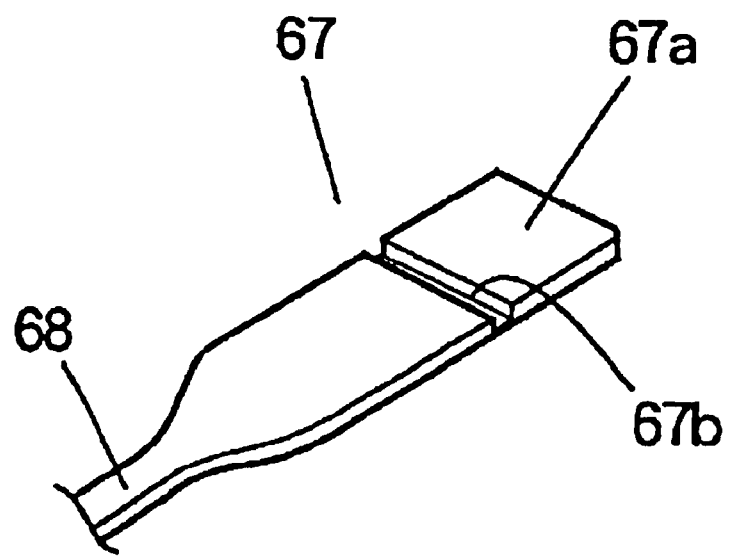
FIG. 10 is a construction diagram showing another embodiment of the construction of the lead pad.
Figure 11:
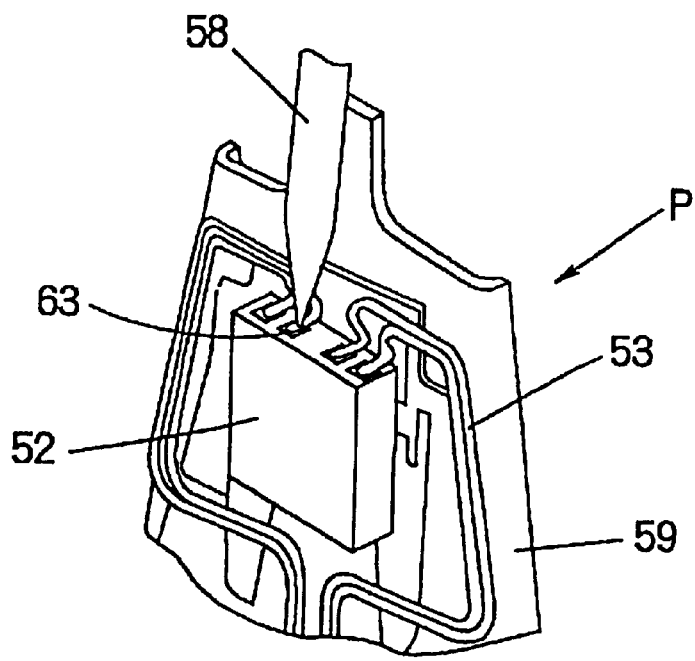
FIG. 11 is a diagram used for describing a Bent Lead method that is a conventional joining method.
Figure 12:
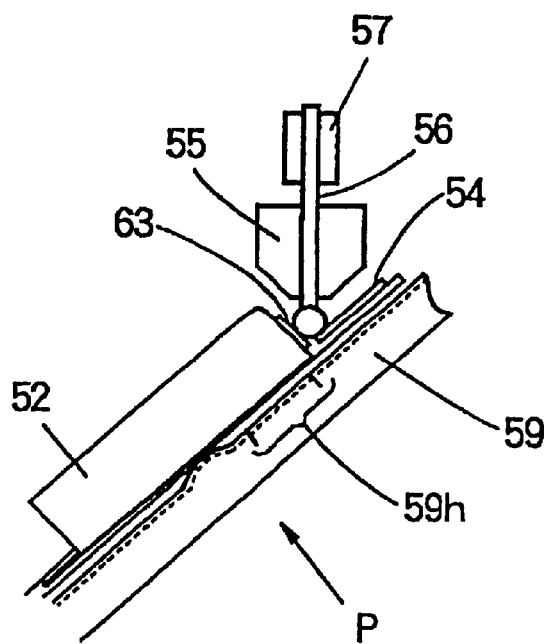
FIG. 12 is a diagram used for describing a gold ball method that is a conventional joining method.
Figure 13:
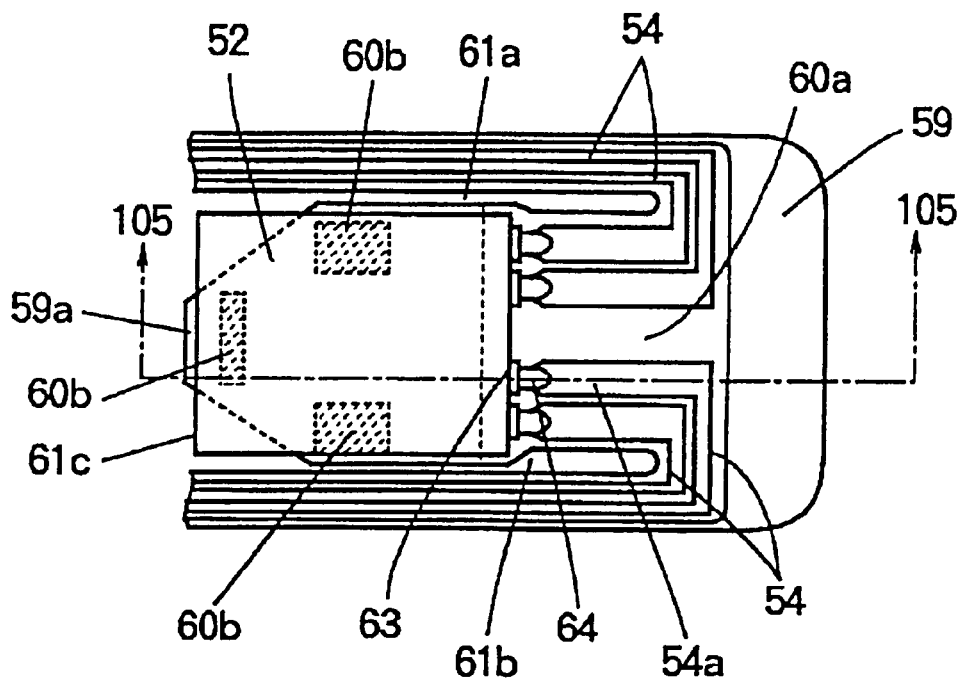
FIG. 13 is a top view showing part of the construction of a conventional HG assembly used in a solder ball joining method.
Figure 14:
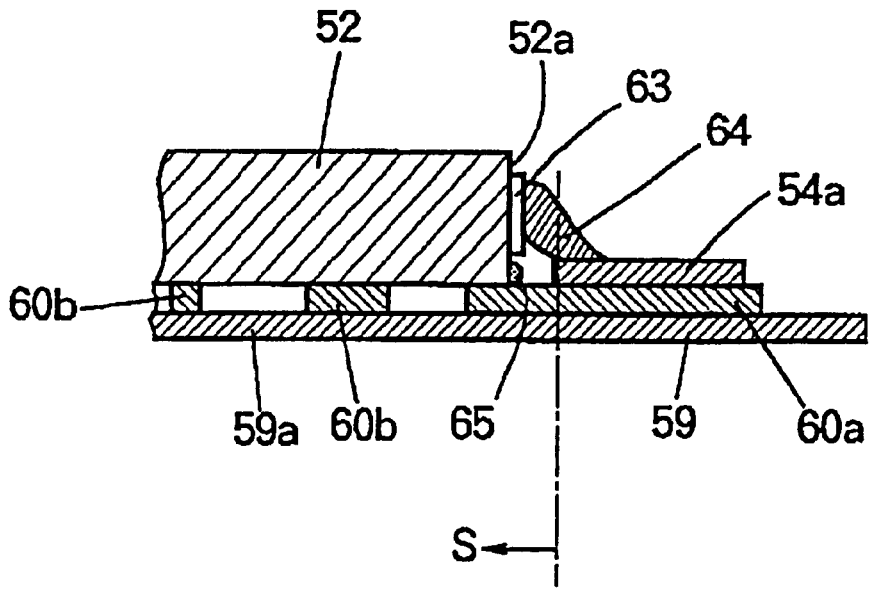
FIG. 14 is a sectional view showing part of the construction of the conventional HG assembly used in the solder ball joining method.

FIGS. 9 and 10 are construction diagrams showing another embodiment of the configuration of lead pads 41 through 44. In FIG. 9, a lead 66 is continuous to the end portion of a lead pad 65 having an area where its heat capacity becomes nearly the same as a bonding pad. This differs from a lead pad 54a in FIG. 13 formed so as to have a wide area. Also, in FIG. 10, the wide end portion 67 of a lead 68 has an elongated configuration, but the lead pad 67a of the point portion is thermally cut off from the lead 68 by a groove 67b, whereby the heat capacity becomes nearly the same as a bonding pad.

The meaning of the "heat capacity is nearly the same" can be judged by a sudden change in an area or configuration such as the aforementioned, but it is not to be limited to this judgement alone. It should be interpreted widely in the comparison of heat capacities at the lead and bonding pad sides.

The invention has several advantages. Aperture 22 is provided under the lead pad 42, as shown in FIG. 5. Therefore, even if an adhesive agent bonding the slider 25 to the flexure tongue 20 protrudes from the joined portion, there is no possibility that the adhesive agent will contact the lead pads 41 to 44 and the bonding pads 28 to 31, because the adhesive agent will be moved downward from the aperture 22. For this reason, the lead pads 41 to 44 can be moved close to the bonding pads 28 to 31 without restrictions.

Also, the slider 25 can be joined directly to the flexure tongue 20 without an insulating sheet for adjusting the height of the slider. Therefore, the bonding pad 29 can be disposed in proximity to the lead pads 28 to 31 with respect to height, so that soldering can easily be performed.

Since the apertures 21, 22 (FIG. 6) are formed in the flexure at a position adjacent to the soldered portion between pads, the rigidity of the flexure at this portion becomes weakened and therefore absorbs the warp produced due to the shrinkage of the soldered portion. As a result, the HG assembly can hold a predetermined posture.

In addition, according to the present invention, the lead pad is designed such that its heat capacity is nearly the same as that of the bonding pad. Therefore, when solder reflows, a temperature rise and a temperature drop in both pads advance substantially simultaneously, so that satisfactory soldering can be performed.

Furthermore, since there is no ultrasonic join process, there is no need to fix the slider. For this reason, there is no need to form an aperture through which a member for pushing the slider against the load beam is passed. Therefore, the configuration of the point portion of the load beam can be made narrow, whereby a reduction in the weight can be achieved.

What is being claimed is:

1. A structure for supporting a slider such that the slider can be moved adjacent to a recording surface of a disk of a disk drive, the structure comprising:

an elastic flexure having a flexure tongue and an aperture, wherein the slider is attached to the flexure tongue in a predetermined direction, and wherein the elastic flexure functions as a suspension;

a plurality of leads supported by the elastic flexure such that an end portion of each lead has a pad facing substantially perpendicular to a pad-joint surface of the pad, wherein the pad-joint surface is formed on the slider, and wherein the aperture is formed such that at least a tip of each of the pads is adjacent to the aperture; and wherein a distal end of the slider is exposed in the aperture and unsupported by the flexure tongue.

2. The structure of claim 1 wherein pads are formed on the slider having a heat capacity that is approximately equal to that of the pads formed on the leads.

3. A head gimbal assembly for moving adjacent to a recording surface of a disk of a disk drive, the head gimbal assembly comprising:

an elastic flexure having an aperture, a flexure tongue, and functioning as a suspension;

a slider supported on the flexure and formed with a plurality of first pads;

a plurality of leads supported by the flexure such that an end portion of each lead has a second pad facing substantially perpendicular to a pad-joint surface of a corresponding one of the plurality of first pads, wherein the second pads are located in proximity to the plurality of first pads, respectively; wherein the aperture is formed such that the first and second pads are adjacent to the aperture; and wherein a distal end of the slider is exposed in the aperture and unsupported by the flexure tongue.

4. The head gimbal assembly of claim 3 wherein a heat capacity of the first pads and a heat capacity of the second pads are approximately equal.

5. A hard disk drive, comprising:

a disk;

a head gimbal assembly for moving adjacent to a recording surface of the disk; wherein the head gimbal assembly comprises:

an elastic flexure having an aperture, a flexure tongue, and functioning as a suspension;

a slider supported on the flexure and formed with a plurality of first pads;

a plurality of leads supported by the flexure such that an end portion of each lead has a second pad facing substantially perpendicular to a pad-joint surface of the first pad, wherein the second pads are located in proximity to the plurality of first pads, respectively; wherein the aperture is formed such that the first and second pads are adjacent to the aperture; and wherein a distal end of the slider is exposed in the aperture and unsupported by the flexure tongue.

6. The hard disk drive of claim 5 wherein a heat capacity of the first pads and a heat capacity of the second pads are approximately equal.

* * * * *